United States Patent [19]

Naiman et al.

[11] 4,388,452
[45] Jun. 14, 1983

[54] OLEFIN-ACRYLONITRILE COPOLYMERS AND USES THEREOF

[75] Inventors: Michael I. Naiman; Rudolf S. Buriks, both of St. Louis, Mo.

[73] Assignee: Petrolite Corporation, St. Louis, Mo.

[21] Appl. No.: 312,063

[22] Filed: Oct. 16, 1981

Related U.S. Application Data

[62] Division of Ser. No. 810,342, Jun. 27, 1977, Pat. No. 4,333,741.

[51] Int. Cl.$^3$ ............................................ C08F 220/42
[52] U.S. Cl. ...................................... 526/342; 44/62; 44/72; 44/DIG. 2
[58] Field of Search ............... 526/342; 260/DIG. 17; 44/62, 72, DIG. 2

[56] References Cited

U.S. PATENT DOCUMENTS 3,126,260  3/1964  Van der Minne et al. ............. 44/62
3,326,870  6/1967  Nakaguchi et al. ................. 526/342
3,560,418  2/1971  Kelly et al. ......................... 526/342

FOREIGN PATENT DOCUMENTS 46-7459  2/1971  Japan .......................... 260/DIG. 17

OTHER PUBLICATIONS

Gaylord et al., "Micromolecules," vol. 2, pp. 442, et seq. (1969).
Ikegami et al., "Journal of Polymer Science, Part A-1," vol. 8, pp. 195–208 (1970).

Primary Examiner—Thomas A. Waltz
Assistant Examiner—Y. Harris-Smith
Attorney, Agent, or Firm—Sidney B. Ring; Hyman F. Glass; Leon Zitver

[57] ABSTRACT

This invention relates to α-olefin-acrylonitrile copolymers and uses thereof, particularly as antistatic agents in organic liquids such as hydrocarbon fuels.

3 Claims, No Drawings

OLEFIN-ACRYLONITRILE COPOLYMERS AND USES THEREOF

This is a division of application Ser. No. 810,342, filed June 27, 1977, now U.S. Pat. No. 4,333,741.

This invention relates to organic liquids having desirable anti-static properties, and, in one of its aspects, relates more particularly to organic liquid compositions in the form of volatile organic liquids such as hydrocarbon fuels or solvents which possess low electrical conductivity which, when they accumulate electrostatic charges, may give rise to the hazards of ignition or explosion. Still more particularly in this aspect, the invention relates to the improvement of such organic liquids by incorporating therein, additives which are effective in increasing the electrical conductivity of such liquids to the extent that accumulation of electrostatic charges, with attendant danger of ignition or explosion, is significantly minimized, particularly in the handling, transportation or treatment of such liquids.

The low electrical conductivity of many volatile organic liquid compositions has presented the problem of controlling static buildup, particularly during handling and transportation, for the purpose of insuring safe and effective distribution without the concomitant danger of ignition or explosion. For example, volatile organic liquids such as hydrocarbon fuels (e.g. gasoline, jet fuels, turbine fuels and the like), or light hydrocarbon oils employed for such purposes as solvents or cleaning fluids for textiles, possess a very low degree of electrical conductivity. In the use of such fluids, electrostatic charges, which may be generated by handling, operation or other means, tend to form on the surface, and may result in sparks, thus resulting in ignition or explosion. These hazards may be encountered merely in the handling or transportation of such organic liquids and even in operations, such as centrifuging, in which a solid is separated from a volatile liquid, during which electrostatic charges can accumulate.

Various materials have heretofore been proposed for incorporation into such organic liquid compositions for increasing their electrical conductivity and thus reduce the aforementioned dangers of ignition and explosion.

The following are examples of patents which describe antistatic agents employed in fuels:

(1) α-olefin-sulfone copolymers
  U.S. Pat. No. 3,578,421
  U.S. Pat. No. 3,677,724
  U.S. Pat. No. 3,807,977
  U.S. Pat. No. 3,811,848
  U.S. Pat. No. 3,917,466

(2) α-olefin-maleic anhydride copolymers
  U.S. Pat. No. 3,677,725

(3) amines and methyl vinyl ether-maleic anhydride copolymers
  U.S. Pat. No. 3,578,421

(4) aliphatic amines-Fluorinated Polyolefins
  U.S. Pat. No. 3,652,238

(5) chromium salts and amine phosphates
  U.S. Pat. No. 3,758,283

We have now discovered a new class of copolymers, namely, α-olefin-acrylonitrile copolymers which are useful as antistatic agents, particularly as antistatic agents in organic fluids such as in hydrocarbon fuels.

The polymers of this invention are copolymers of acrylonitrile and an α-olefin ideally presented as follows:

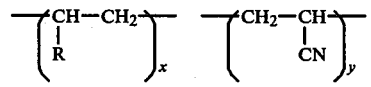

where R is a substitute group such as an alkyl group having from about 4–26 or more carbons, for example (the α-olefin thereby having 6–28 carbon atoms), from about 4 to 20, but preferably from about 8 to 18 carbon atoms; an aryl or a substituted aryl group such as a phenyl or a substituted phenyl group such as an alkyl phenyl, the alkyl group having from about 1 to 26 carbon atoms, such as from about 1 to 20 carbon atoms, but preferably from about 1 to 16 carbon atoms. The molar ratio of acrylonitrile to α-olefin, i.e., y:x, can vary widely, for example from about 1:1 to 5:1, for example from about 1:1 to 4:1, but preferably from about 2:1 to 4:1. The molecular weight of the copolymer can vary widely such as from about 1,000 to 100,000 or more, for example from about 1,500 to 50,000, but preferably from about 2,000 to 10,000.

The olefins useful for the preparation of the copolymers are 1-alkenes of about 6 to 28 carbon atoms. The 1-alkenes are generally available commercially as pure or mixed olefins from petroleum cracking processes or from the polymerization of ethylene to a low degree. The useful 1-alkenes include for example 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonodecene, 1-eicosene, 1-heneicosene, 1-docosene, 1-tricosene and 1-tetracosene. While the normal straight chain 1-alkenes are preferred, it is understood that 1-alkenes containing branched chains are also useful. It is also understood that a mixture of 1-alkenes may be used and may often be desirable since a mixture of 1-alkenes is often obtainable at a lower cost than are pure olefins. The olefin portion of the copolymer should be an olefin of at least 6 carbon atoms to insure that the copolymer is sufficiently soluble in hydrocarbons. For practical and economic reasons, the olefin used for the preparation of the copolymer should have less than about 28 carbon atoms. The preferred olefins will have from about 10 to 20 carbon atoms, the most preferred olefin having 10 carbon atoms, i.e., 1-decene.

The other component of the copolymer is acrylonitrile or a derivative thereof such as

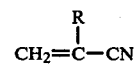

where R is H or an alkyl such as methyl, etc.

The copolymers of the invention are prepared by complexing the acrylonitrile with a Lewis acid such as $AlCl_3$, $ZnCl_2$, $BF_3$, $AlR_nCl_{3-n}$ and then polymerizing the complexed material with a terminal olefin using a free radical initiator. These techniques are well known to those skilled in the art and these copolymers may be prepared by a variety of known methods such as those described by Gaylord et al, *Macromolecules*, Vol. 2, page 442, et seq. 1969, and Ikegami et al., *Journal of Polymer Science, Part A*-1, Vol. 8, pages 195–208 (1970). The ratio of nitrile to olefin is controlled by the ratio of nitrile to complexing agent employed. With ratios of 1–1 to 2–1 the polymers approach an alternating system. With ratios of 2–1 to 10–1 the polymers closely resemble the feed ratios employed, while higher than 10–1 ratios give less effective products.

The following examples are presented by way of illustration and not of limitation.

EXAMPLE 1

Preparation of an Acrylonitrile-octadecene copolymer

Into a three necked flask fitted with stirrer, thermometer, and nitrogen purge is placed 100 mls of 1,2-dichloroethane, 13.25 gms acrylonitrile and 6.7 gms of aluminum chloride. An exotherm occurs and the reaction flask is cooled externally. 21 gms of octadecene-1 and 0.7 gms of azobis-isobutyronitrile are then added and the reaction system is purged with dry nitrogen for 1 hr. The temperature is slowly raised to 65° F. and the polymerization is allowed to proceed for 24 hours. The total viscous mass is poured into an excess of methanol-water and the aluminum salts are washed out. The solvent is removed and the yield of polymer is 31 gms. Infrared analysis shows the presence of nitrile and only a trace of olefin remaining. Nitrogen analysis shows the ratio of acrylonitrile to octadecene in the polymer to be 2.5/1 and gel permeation chromatography indicates an approximate molecular weight of 6000.

EXAMPLE 2–8

Following the procedure outlined in example 1, alternating copolymers of acrylonitrile and (2) hexene-1,
(3) octene-1,
(4) decene-1,
(5) dodecene-1,
(6) tetradecene,
(7) hexadecene-1, and
(8) eicosene-1 were prepared. All the polymers raised the conductivity of hydrocarbon fuel oils when added at levels of 1–10 parts per million.

In accordance with the present invention, improved liquid hydrocarbon compositions are provided containing antistatic agent in an amount sufficient to impart antistatic properties.

In general, the present invention, in its preferred applications contemplates organic liquid compositions which normally are capable of accumulating a relatively large degree of electrostatic charge resulting in the aforementioned hazards of ignition and explosion, having incorporated therein a small amount of the aforementioned reaction product, usually from about 0.1 to about 200, and preferably from about 1 to about 10 pounds, per thousand barrels of the total volume of the liquid composition, i.e., from about 0.1 to 100 ppm, such as from about 0.2 to 50 ppm, but preferably from about 0.5 to 10 ppm.

A field of specific applicability of the present invention is in the improvement of organic liquid compositions in the form of petroleum distillate fuel oils having an initial boiling point from about 75° F. to about 135° F. and an end boiling point from about 250° F. to about 1000° F. It should be noted, in this respect, that the term "distillate fuel oils" is not intended to be restricted to straight-run distillate fractions. These distillate fuel oils can be straight-run distillate fuel oils, catalytically or thermally cracked (including hydrocracked) distillate fuel oils, or mixtures of straight-run distillate fuel oils, naphthas and the like, with cracked distillate stocks. Moreover, such fuel oils can be treated in accordance with well-known commercial methods, such as acid or caustic treatment, hydrogenation, solvent refining, clay treatment, and the like.

The distillate fuel oils are characterized by their relatively low viscosity, pour point and the like. The principal property which characterizes these contemplated hydrocarbons, however, is their distillation range. As hereinbefore indicated, this range will lie between about 75° F. and about 1000° F. Obviously, the distillation range of each individual fuel oil will cover a narrower boiling range, falling nevertheless, within the above-specified limits. Likewise, each fuel oil will boil substantially, continuously, throughout its distillation range.

Particularly contemplated among the fuel oils are Nos. 1, 2 and 3 fuel oils, used in heating and as diesel fuel oils, gasoline, turbine fuels and the jet combustion fuels, as previously indicated. The domestic fuel oils generally conform to the specifications set forth in ASTM Specification D396-4ST. Specifications for diesel fuels are defined in ASTM Specification D975-48T. Typical jet fuels are defined in Military Specification MIL-F-56243.

Other fields of specific applicability of the present invention are: solvents, as used with paints; spot removers such as naphtha cleaners; textile compositions; pigments; liquid polishes; rubber compositions and the like. In brief, the antistatic agents of this invention can be used with a composition susceptible of accumulating a static electrical charge or a composition susceptible of generation of such a charge. Thus, a static electrical charge accumulated by such a composition can be reduced by coating a surface of the composition with one or more of the novel antistatic agents. For example, a fabric or fibre can be surface treated with one or more of the agents to reduce the susceptibility of the fabric or fibre to accumulate a static electrical charge.

The copolymers of this invention, when added in concentrations of 1–100 ppm to fuel oils, increase the conductivity of the fuel substantially. Depending on the nature of the fuel and the structure of the specific nitrile copolymer the increases in conductivity will vary. However in all cases there is a substantial increase in the conductivity of the system.

In the examples, all conductivity measurements were made with a Maihak Conductivity Indicator (H. Maihak A. G. Hamburg, Germany). In the operation, the device imposes a potential of 6 volts of direct current on a pair of chromium plated electrodes immersed in the fluid to be tested. The current resulting from this potential, which is in the order or $10^{-9}$ to $10^{-8}$ ampere, is amplified and used to activate a dial calibrated in conductivity units. A conductivity unit is 1 picohm per meter.

TABLE 1

| | CONDUCTIVITY OF α-OLEFIN-ACRYLONITRILE COPOLYMERS | | | |
|---|---|---|---|---|
| | Amt. | R-group | Conductivity (C.U.) | |
| Ex. | Additive | of Olefin | Fuel Oil A | Fuel Oil B |
| | None | | 5 | 20 |
| 4 | 3 ppm | $C_8$ | 70 | 90 |
| 6 | 3 ppm | $C_{12}$ | 173 | 185 |
| 7 | 3 ppm | $C_{14}$ | 180 | 160 |
| 1 | 3 ppm | $C_{16}$ | 178 | 130 |
| 8 | 3 ppm | $C_{18}$ | 150 | 160 |

EXAMPLE 9

Using the same equipment described previously, 100 mls of benzene and 13.25 gms of acrylonitrile is placed in the flask using a nitrogen purge. To this is added, with external cooling, 28 mls of a 25% solution of ethylaluminum sesquichloride. 21 gms of octadecene-1 and 0.7 gms of azobisisobutyronitrile are then added and the mixture is stirred for 1 hr. The temperature is raised to 85° and the polymerization is continued for 24 hours. The total mass is poured into an excess of methanol-water and the aluminum salts are washed out. Nitrogen analysis shows a nitrile to olefin ratio of 2.5 to 1 and the molecular weight is approximately 2500. When 3 ppm of the above polymer is added to a kerosine with a base conductivity of 2 conductivity units the conductivity rises to 76 C.U.'s.

While specific examples of this invention have been presented herein, it is not intended to limit the invention solely thereto, but to include all variations and modifications within the spirit of the invention. Thus, the copolymers of this invention can be employed as antistatic agents alone or in combination with other known antistatic agents or those agents which enhance, by synergism, the effects of antistatic agents.

We claim:

1. A copolymer of a 1-alkene and acrylonitrile wherein the 1-alkene has from 6 to 28 carbon atoms, the molar ratio of acrylonitrile to 1-alkene is about 2:1 to 5:1 and the molecular weight of the copolymer is from about 1,000 to about 100,000.

2. The copolymer of claim 1 wherein the 1-alkene has from 10 to 20 carbon atoms.

3. The copolymer of claim 1 which has a molecular weight of from about 2,000 to about 10,000.

* * * * *